(12) United States Patent
McNally et al.

(10) Patent No.: US 7,461,506 B2
(45) Date of Patent: Dec. 9, 2008

(54) EXHAUST GAS COOLER

(75) Inventors: Thomas E. McNally, Gilbert, AZ (US); Carson F. Langdon, Mesa, AZ (US); Jenny L. Wang, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 92 days.

(21) Appl. No.: 11/533,780

(22) Filed: Sep. 21, 2006

(65) Prior Publication Data

US 2008/0072582 A1 Mar. 27, 2008

(51) Int. Cl.
*F01N 3/02* (2006.01)

(52) U.S. Cl. .............. 60/320; 60/293; 60/298; 60/318; 60/324; 138/112; 138/113; 138/148; 181/227; 181/249

(58) Field of Classification Search .......... 60/289, 60/292, 293, 298, 307, 308, 317, 318, 320, 60/323, 324; 138/110, 112, 113, 148; 181/227, 181/249
See application file for complete search history.

(56) References Cited

U.S. PATENT DOCUMENTS

| | | | | |
|---|---|---|---|---|
| 2,586,788 A | * | 2/1952 | Cushman | 181/262 |
| 4,638,632 A | * | 1/1987 | Wulf et al. | 60/319 |
| 4,926,638 A | * | 5/1990 | Kakuta | 60/319 |
| 5,466,900 A | * | 11/1995 | Knapp | 181/227 |
| 5,904,042 A | * | 5/1999 | Rohrbaugh | 60/298 |
| 6,595,318 B2 | * | 7/2003 | Ebinger et al. | 181/227 |
| 7,007,720 B1 | * | 3/2006 | Chase et al. | 138/110 |

\* cited by examiner

*Primary Examiner*—Binh Q. Tran

(57) ABSTRACT

The invention concerns an exhaust gas cooler employed with a tailpipe of a vehicle exhaust system and a method of cooling exhaust gasses before being emitted from the exhaust system into the atmosphere. The exhaust gas cooler may include a cooler housing having a substantially cylindrical shape with an open forward edge, an open rearward edge, and an internal diameter that is larger than the external diameter of the tailpipe, and a cooler support attached to and supporting the cooler housing such that the rearward edge of the tailpipe is located within the cooler housing between the forward and rearward edges of the cooler housing.

16 Claims, 3 Drawing Sheets

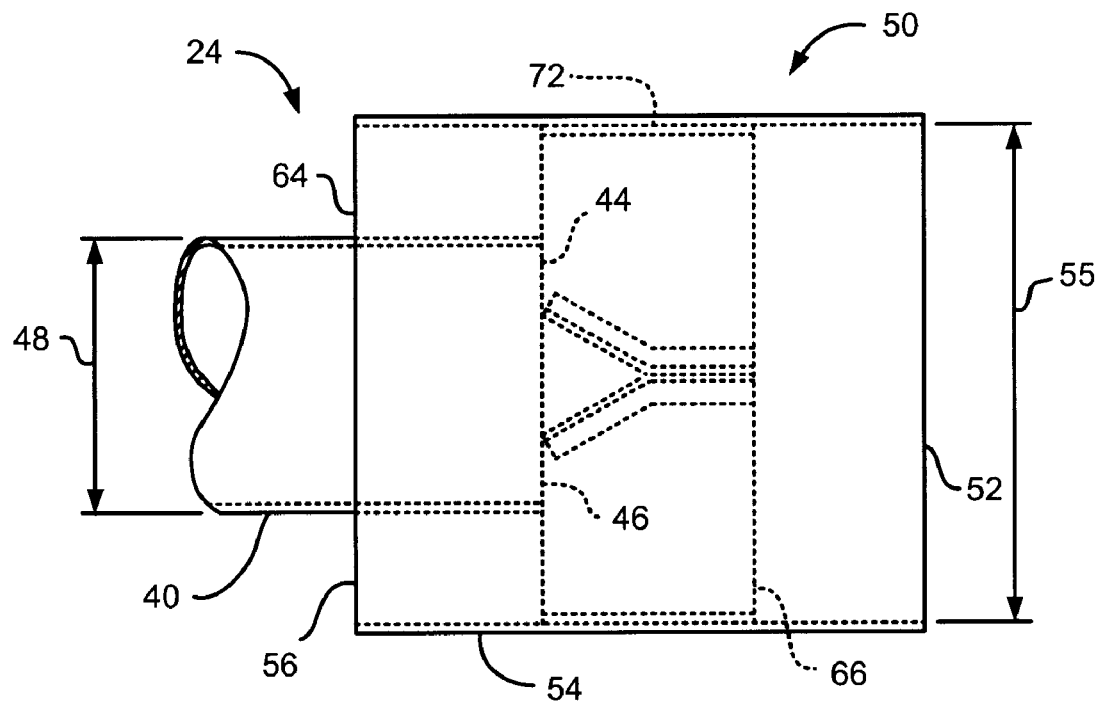
Fig. 2
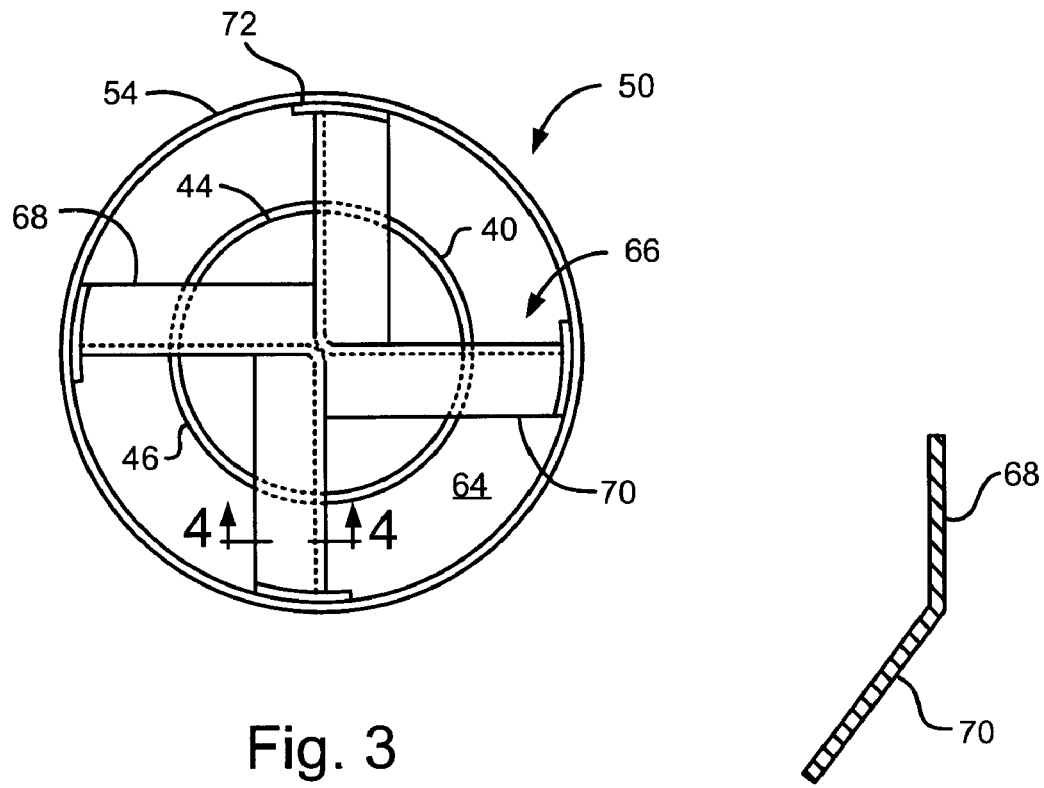
Fig. 3
Fig. 4

EXHAUST GAS COOLER

BACKGROUND OF THE INVENTION

The present invention relates generally to a vehicle exhaust system, and more particularly to a system and method for cooling exhaust gasses before exiting the vehicle exhaust system.

Recent emissions regulations for vehicles employing diesel engines limit the amount of soot that the vehicles may emit. The soot is produced as a by-product of the combustion of the diesel fuel and is carried out with the vehicle exhaust. Diesel particulate filters (also called traps) added to the exhaust system limit the soot emissions sufficiently to meet the regulations.

Diesel particulate filters work by collecting the soot while allowing the exhaust gasses to pass through. As the vehicle operates, then, the soot builds up in the filter. This soot needs to be periodically eliminated from the filter in order to assure that the filter does not become clogged. A clogged filter can potentially cause damage to itself or the engine. The soot that builds up in the filter can be removed through a process called regeneration.

Regeneration is performed by heating the diesel particulate filter to a high temperature so the soot will burn away, thus cleaning out the filter. However, during regeneration, the heat used to cause the regeneration process causes the exhaust gasses to be expelled out of the tailpipe at higher temperatures than is desirable. Thus, it is desirable to cool the high temperature exhaust gasses—especially those that occur during regeneration—before they are expelled from the exhaust system.

SUMMARY OF THE INVENTION

An embodiment contemplates an exhaust gas cooler for use with a tailpipe of a vehicle exhaust system. The exhaust gas cooler comprises a cooler housing having a substantially cylindrical shape with an open forward edge, an open rearward edge, and an inner diameter that is adapted to be larger than an exterior diameter of the tailpipe; and a cooler support attached to the cooler housing and adapted to support the cooler housing such that a rearward edge of the tailpipe is located within the cooler housing between the forward and rearward edges of the cooler housing.

An embodiment contemplates an exhaust system for a vehicle having an engine. The exhaust system may include a tailpipe having an outlet at a rearward edge and having an external diameter adjacent to the rearward edge; and an exhaust gas cooler including a cooler housing having a substantially cylindrical shape with an open forward edge, an open rearward edge, and an internal diameter that is larger than the external diameter of the tailpipe, and a cooler support attached to and supporting the cooler housing such that the rearward edge of the tailpipe is located within the cooler housing between the forward and rearward edges of the cooler housing.

An embodiment contemplates a method of cooling exhaust gasses produced by a vehicle engine before the exhaust gasses are discharged from a vehicle exhaust system, the method comprising the steps of: providing an exhaust gas cooler around a rearward edge of a tailpipe such that the exhaust gas cooler includes a cooler housing having a rearward edge and a forward edge, with the rearward edge of the tailpipe being located between the rearward and forward edges of the cooler housing; operating the engine, causing the exhaust gasses to flow from an outlet on the rearward edge of the tailpipe; drawing ambient air into the exhaust gas cooler; mixing the exhaust gasses and the ambient air; and expelling an exhaust gas/ambient air mixture out of the rearward edge of the cooler housing.

An advantage of an embodiment is that the exhaust gas cooler mixes hot exhaust gasses with cooler air, thus lowering the temperature of the exhaust gasses before they are expelled from the exhaust system. This is particularly advantageous for vehicles having a diesel particulate filter that needs to be regenerated from time to time.

BRIEF DESCRIPTION OF THE DRAWINGS

FIG. 2 is a schematic side view of an exhaust gas cooler and a portion of a tailpipe, without cooler supports shown.

FIG. 3 is a schematic end view of the exhaust gas cooler and tailpipe, without cooler supports shown.

FIG. 4 is a section cut, on an enlarged scale, taken along line 4-4 in FIG. 3.

DETAILED DESCRIPTION

Figure 1:
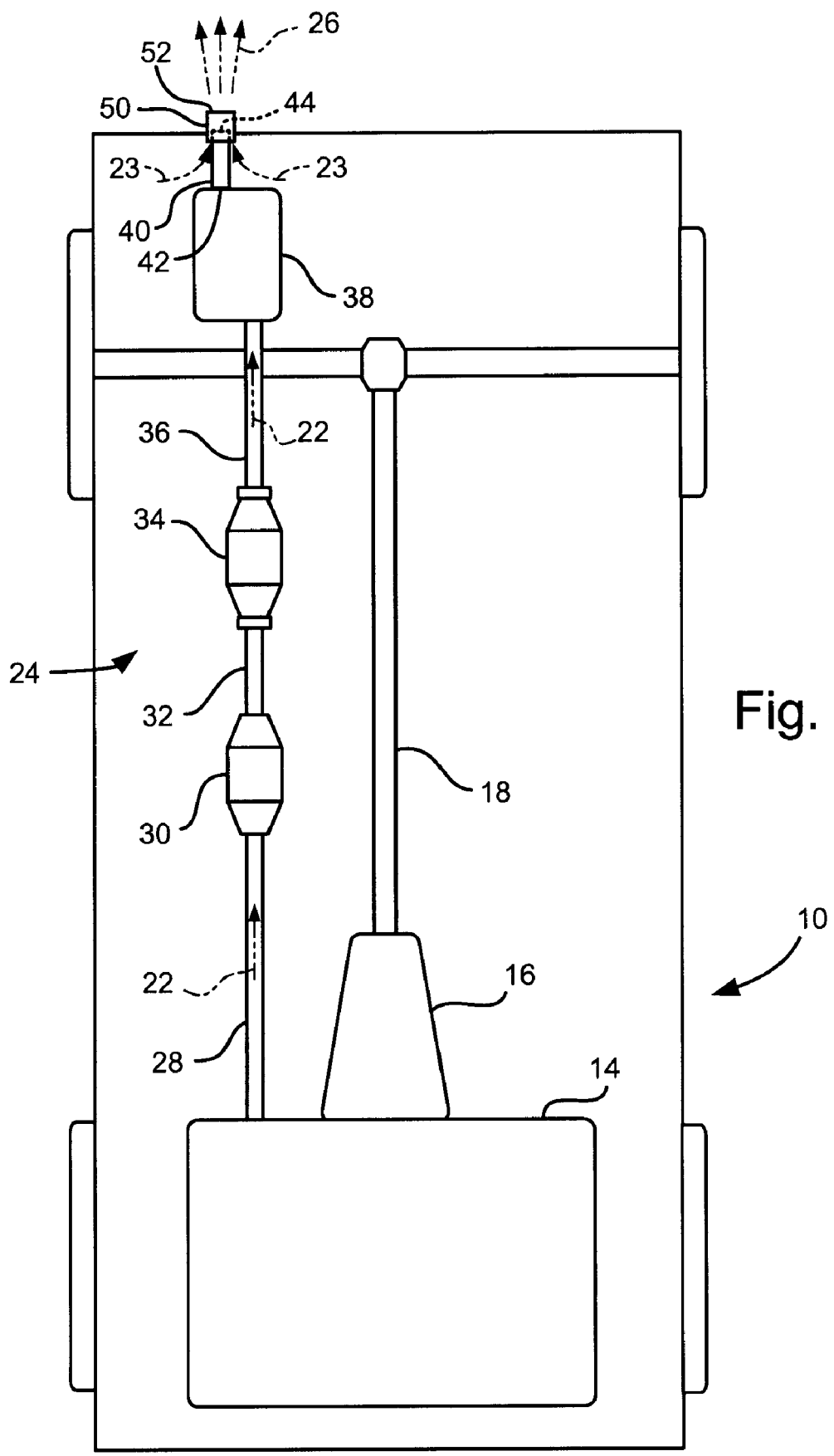
FIG. 1 is a schematic illustration of a vehicle with a diesel engine, and a portion of an exhaust system for the vehicle.
Figure 5:
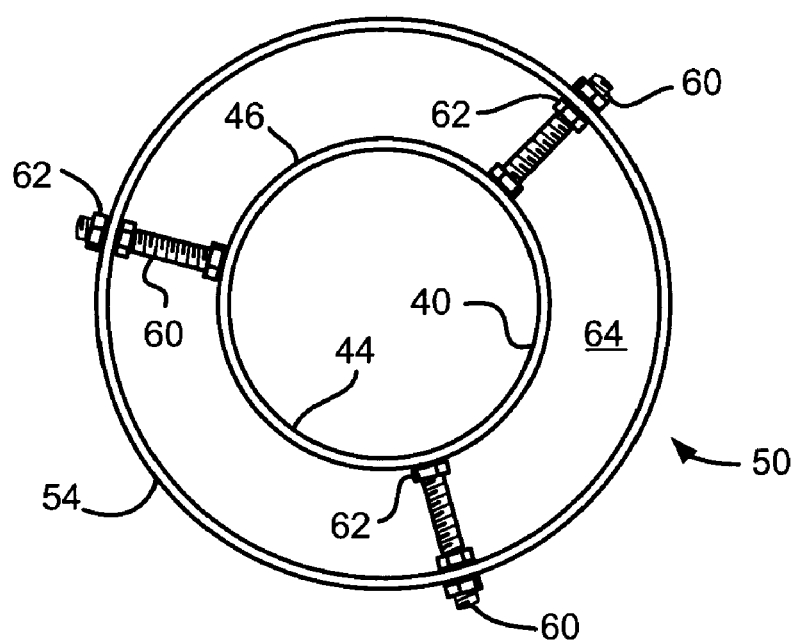
FIG. 5 is a schematic end view of the exhaust gas cooler and tailpipe, without the cross vane assembly shown.
Figure 6:
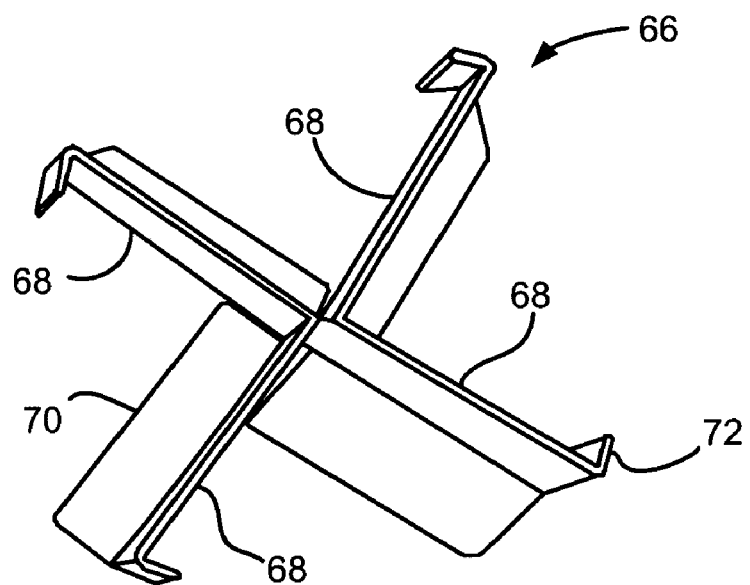
FIG. 6 is a schematic end view of the cross vane assembly.

FIG. 1 illustrates a vehicle 10 having an engine, which may be a diesel engine 14, mounted therein. The diesel engine 14 drives a transmission 16, which, in turn, drives a vehicle driveline 18, and, ultimately, vehicle wheels.

An exhaust system 24 receives exhaust gasses 22 from the diesel engine 14, treats the exhaust gasses 22, and directs them into the atmosphere away from the vehicle 10. More specifically, an exhaust pipe 28 connects at an upstream end to conventional exhaust system hardware (not shown), such as, for example, a turbocharger (not shown), that receives exhaust from exhaust manifolds (not shown) on the engine 14. The exhaust pipe 28 directs the exhaust gases 22 into a diesel oxidation converter 30 (also known as a diesel oxidation catalyst). The diesel oxidation converter 30 treats the exhaust gases 22 in order to reduce the amounts of certain constituents that will be emitted into the atmosphere. Such constituents may be, for example, carbon monoxide (CO) and unburned hydrocarbons (HC).

A first intermediate pipe 32 connects to the downstream end of the diesel oxidation converter 30 and directs the exhaust gasses 22 into a diesel particulate filter 34 (also called a diesel particulate trap). The diesel particulate filter 34 is basically a filter for collecting (i.e., trapping) soot (also called diesel particulate matter) from the exhaust in order to minimize the amount of soot in the exhaust gasses 22. Downstream of the diesel particulate filter 34 is a second intermediate pipe 36. The second intermediate pipe 36 directs the exhaust gasses 22 into a muffler 38. Alternatively, the exhaust system 24 has no muffler or second intermediate pipe and the diesel particulate filter 34 directs the exhaust gasses 22 directly into a tailpipe (discussed below). The vehicle and its components discussed above are known to those skilled in the art and so will not be discussed or shown in more detail herein.

The muffler 38 directs the exhaust flow into an inlet 42 of a tailpipe 40. The tailpipe 40 includes an outlet 44. Near the outlet 44, the tailpipe 40 connects to and supports an exhaust gas cooler 50. The exhaust gas cooler 50 includes an open rearward edge 52, which extends rearward past the tailpipe 40. The open rearward edge 52 is where an exhaust gas/ambient air mixture 26 are emitted into the atmosphere away from the vehicle 10.

FIGS. 2-6 illustrate the exhaust gas cooler 50, and its attachment to the tailpipe 40 in more detail. The exhaust gas cooler 50 includes a generally cylindrical cooler housing 54 having an open forward edge 56 and the open rearward edge 52. The cooler housing 54 has an internal diameter 55 that is substantially larger than an external diameter 48 of the tailpipe 40. For example, the internal diameter 55 of the cooler housing 54 may be about one-and-one-half to two-and-one-half times the external diameter 48 of the tailpipe 40. Because of this difference in diameters, there is an opening 64 on the forward edge 56 all of the way around the tailpipe 40.

The tailpipe 40 is coaxial with the cooler housing 54, and has a tailpipe rearward edge 46 that extends past the cooler housing forward edge 56 in order to create some axial overlap. For example, the rearward edge 46 may extend between about one-quarter and one-half of the way into the cooler housing 54 toward the housing rearward edge 52.

The cooler housing 54 may be mounted on and aligned with the tailpipe 40 with cooler supports, which are illustrated in this embodiment as threaded fasteners 60 and corresponding nuts 62. A first set of nuts 62 may be used to press against the tailpipe 40, while a second and third set of nuts 62 are adjusted on the fasteners 60 to align and support the cooler housing 54 relative to the tailpipe 40. Alternatively, the cooler supports may be one or more brackets (not shown) attached between the cooler housing 54 and tailpipe 40 to align and support the exhaust gas cooler 50 relative to the tailpipe. The brackets may be secured between the components by welding, with adhesive, or with fasteners. As another alternative, although not considered as desirable for alignment purposes, the exhaust gas cooler 50 may have cooler supports (not shown) mounted to vehicle structure (not shown) to hold the cooler housing 54 at the proper location and orientation relative to the tailpipe 40.

The exhaust gas cooler 50 may also include a cross vane assembly 66 that mounts inside the cooler housing 54 adjacent to the rearward edge 46 of the tailpipe 40. The cross vane assembly 66 may include four vanes 68. Each vane 68 may have an angled vane blade portion 70 for redirecting flow (discussed below), and an attachment flange 72 for mounting the cross vane assembly 66 to the inside of the cooler housing 54. The attachment flanges 72 may be secured to the cooler housing 54 by welding. Alternatively, the attachment flanges may be secured by adhesive, interference fit, fasteners (not shown), or other suitable means.

The operation of the exhaust gas cooler 50, in view of FIGS. 1-6, will now be discussed. When the vehicle engine 14 is running, the exhaust gasses 22 produced by the engine 14 flow through the exhaust pipe 28, diesel oxidation converter 30, first intermediate pipe 32, diesel particulate filer 34 (where particulates are trapped), second intermediate pipe 36, and muffler 38. From the muffler 38, the exhaust gasses 22 flow through the tailpipe 40 and the exhaust gas cooler 50 and out into the atmosphere.

As the exhaust gasses 22 flow out through the outlet 44 on the rearward edge 46 of the tailpipe 40 and into the cooler 50, they create a vacuum around the rearward edge 46. This vacuum causes ambient air 23 to be drawn in through the opening 64 (around the tailpipe 40) at the forward edge 56 of the cooler 50. This ambient air 23, then, moves through the cooler 50 with the exhaust gasses 22 and exits the cooler 50 at its open rearward edge 52 as the exhaust/air mixture 26. The ambient air 23 absorbs some of the heat energy of the exhaust gasses 22 as they are mixed, thereby lowering the energy level of the exhaust gasses 22 and raising the energy level of the ambient air 23. The overall temperature of the exhaust/ambient air mixture 26 exiting the exhaust gas cooler 50, then, is lower than the exhaust gasses 22 as they exit the tailpipe 40. The end result is a lower overall temperature of the mixture 26 exiting the vehicle 10 to the atmosphere, distributed through the larger diameter opening of the cooler 50.

In addition, the exhaust gas cooler 50 may also contain the cross vane assembly 66. The cross vane assembly 66 will create somewhat of a swirl flow pattern, which helps to better mix the exhaust gasses 22 with the lower temperature ambient air 23 as they flow through the exhaust gas cooler 50. This may allow the ambient air 23 to more thoroughly absorb heat energy from the exhaust gasses 22 since they are better mixed, thereby more evenly lowering the temperature of the exhaust gasses 22 and raising the temperature of the ambient air 23. The effective result is a lower temperature mixture 26 more evenly distributed through the larger diameter opening at the rearward edge 52 of the cooler 50.

The exhaust gas cooler 50 is particularly advantageous for the vehicle 10 having the diesel engine 14 and the exhaust system 24 that employs the diesel particulate filter 34. The regeneration process for the filter 34 can cause the temperature of the exhaust gas 22 to rise significantly over normal operating conditions. Accordingly, the exhaust gas cooler 50, by mixing the very hot exhaust gasses 22 with the ambient air 23, will help lower these very high temperatures before exiting the exhaust system 24 of the vehicle 10. Although the exhaust gas cooler 50 may be most advantageous when employed with a vehicle having a diesel engine, the exhaust gas cooler can be employed with vehicles having different types of engines.

While certain embodiments of the present invention have been described in detail, those familiar with the art to which this invention relates will recognize various alternative designs and embodiments for practicing the invention as defined by the following claims.

What is claimed is:

1. An exhaust system for a vehicle having an engine comprising:
   a tailpipe having an outlet at a rearward edge and having an external diameter adjacent to the rearward edge; and
   an exhaust gas cooler including a cooler housing having a substantially cylindrical shape with an open forward edge, an open rearward edge, and an internal diameter that is larger than the external diameter of the tailpipe; a cooler support attached to and supporting the cooler housing such that the rearward edge of the tailpipe is located within the cooler housing between the forward and rearward edges of the cooler housing; and a cross vane assembly including a vane mounted in the cooler housing between the rearward edge of the tailpipe and the open rearward edge of the cooler housing. the vane extending radially across substantially the entire inner diameter of the cooler housing.

2. The exhaust system of claim 1 wherein the cooler support locates the cooler housing in a coaxially aligned relationship with the tailpipe.

3. The exhaust system of claim 1 wherein the vane includes a vane blade portion that is angled relative to the rearward edge of the tailpipe, whereby the vane blade portion imparts a swirling motion to exhaust gasses exiting the outlet of the tailpipe.

4. The exhaust system of claim 3 wherein the vane blade includes an attachment flange secured to the cooler housing.

5. The exhaust system of claim 1 wherein the cooler support includes a plurality of fasteners secured between the tailpipe and the cooler housing, the fasteners supporting the cooler housing on the tailpipe.

6. The exhaust system of claim 1 including a diesel particulate filter located between the engine and the tailpipe.

7. A method of cooling exhaust gasses produced by a vehicle engine before the exhaust gasses are discharged from a vehicle exhaust system, the method comprising the steps of:
  (a) providing an exhaust gas cooler around a rearward edge of a tailpipe such that the exhaust gas cooler includes a cooler housing having a rearward edge and a forward edge, with the rearward edge of the tailpipe being located between the rearward and forward edges of the cooler housing;
  (b) operating the engine, causing the exhaust gasses to flow from an outlet on the rearward edge of the tailpipe;
  (c) drawing ambient air into the exhaust gas cooler;
  (d) mixing the exhaust gasses and the ambient air by imparting a swirling motion to the exhaust gasses and the ambient air; and
  (e) expelling an exhaust gas/ambient air mixture out of the rearward edge of the cooler housing.

8. The method of claim 7 wherein step (c) is further defined by drawing the ambient air into the cooler housing through the forward edge of the cooler housing.

9. The method of claim 7 wherein step (d) is further defined by providing a cross vane assembly adjacent to the rearward edge of the tailpipe to thereby impart the swirling motion.

10. The method of claim 7 including the steps of (f) providing a diesel particulate filter in the vehicle exhaust system; and (g) supplying heat to the diesel particulate filter to cause regeneration of the diesel particulate filter.

11. An exhaust system for a vehicle having an engine comprising:
  a tailpipe having an outlet at a rearward edge and having an external diameter adjacent to the rearward edge; and
  an exhaust gas cooler including a cooler housing having a substantially cylindrical shape with an open forward edge, an open rearward edge, and an internal diameter that is larger than the external diameter of the tailpipe; a cooler support attached to and supporting the cooler housing such that the rearward edge of the tailpipe is located within the cooler housing between the forward and rearward edges of the cooler housing; and a cross vane assembly mounted in the cooler housing between the rearward edge of the tailpipe and the rearward edge of the cooler housing, the vane assembly configured to impart a swirling motion in at least one of exhaust gasses exiting the tailpipe and ambient air flowing from the open forward edge of the cooler housing past the rearward edge of the tailpipe.

12. The exhaust system of claim 11 wherein the cooler support supports the cooler housing in a coaxially aligned relationship with the tailpipe.

13. The exhaust system of claim 11 wherein the cross vane assembly includes a plurality of cross vanes that extend in a radial direction across substantially the entire internal diameter of the cooler housing.

14. The exhaust system of claim 13 wherein the plurality of cross vanes are located adjacent to the rearward edge of the tailpipe and the vanes are configured to impart the swirling motion.

15. The exhaust system of claim 11 wherein the cooler support includes a plurality of fasteners secured between the tailpipe and the cooler housing to support the cooler housing on the tailpipe.

16. The exhaust system of claim 11 including a diesel particulate filter located upstream from the tailpipe.

\* \* \* \* \*